US009753876B1

(12) United States Patent
Hanscom

(10) Patent No.: US 9,753,876 B1
(45) Date of Patent: *Sep. 5, 2017

(54) PROCESSING OF INBOUND BACK-TO-BACK COMPLETIONS IN A COMMUNICATION SYSTEM

(71) Applicant: International Business Machines Corporation, Armonk, NY (US)

(72) Inventor: Jeffrey C. Hanscom, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,974

(22) Filed: Sep. 22, 2016

(51) Int. Cl.
*G06F 11/10* (2006.01)
*H03M 13/00* (2006.01)
*G06F 13/364* (2006.01)
*G06F 13/16* (2006.01)
(Continued)

(52) U.S. Cl.
CPC ........ *G06F 13/364* (2013.01); *G06F 11/1004* (2013.01); *G06F 13/1673* (2013.01); *G06F 13/4068* (2013.01); *G06F 13/4282* (2013.01); *G06F 2213/0026* (2013.01)

(58) Field of Classification Search
CPC .. G06F 9/3851; G06F 9/3867; G06F 12/0813; G06F 13/4286; G06F 9/3857; H04L 49/109
See application file for complete search history.

(56) References Cited

U.S. PATENT DOCUMENTS 7,953,908 B2    5/2011  Ward
8,788,732 B2    7/2014  Zhu et al.
(Continued)

FOREIGN PATENT DOCUMENTS

CN    103678235    3/2014

OTHER PUBLICATIONS

GE Intelligent Platforms, CNIC-A2PU4, Dual Port ARINC 664 Four Lane PCI Express Interface, 2012, 2 pages.
(Continued)

*Primary Examiner* — Guy Lamarre
(74) *Attorney, Agent, or Firm* — Cantor Colburn LLP

(57) ABSTRACT

A system includes an input/output adapter operable to receive a plurality of packets. The system includes a controller operatively connected to the input/output adapter. The controller is operable to receive a first packet including completion data on a first multi-stage pipeline and a second packet including completion data on a second multi-stage pipeline in parallel. The controller shares completion update information between the first multi-stage pipeline and the second multi-stage pipeline based on determining that the completion data of the first packet and the completion data of the second packet are associated with a same request. An aspect of the completion update information is adjusted to maintain a sequential completion order in a buffer to hold the completion data of the first packet and the completion data of the second packet based on the sharing of the completion update information between the first multi-stage pipeline and the second multi-stage pipeline.

15 Claims, 8 Drawing Sheets

(51) Int. Cl.
*G06F 13/40* (2006.01)
*G06F 13/42* (2006.01)

(56) References Cited

U.S. PATENT DOCUMENTS

2007/0028152 A1    2/2007   Mishra et al.
2013/0339558 A1*  12/2013   Zhu ..................... G06F 9/3851
                                                    710/105

OTHER PUBLICATIONS

List of IBM Patents or Patent Applications Treated as Related, Oct. 20, 2016, 2 pages.
U.S. Appl. No. 15/276,911, filed Sep. 27, 2016, Entitled: Cut-Through Buffer With Variable Frequencies, First Named Inventor: Jeffrey C. Hansom.
U.S. Appl. No. 15/272,858, filed Sep. 22, 2016, Entitled: Multi-Source Data Insertion Using an Elastic Fifo, First Named Inventor: Jeffrey C. Hansom.
U.S. Appl. No. 15/275,529, filed Sep. 26, 2016, Entitled: Multi-Packet Processing With Ordering Rule Enforcement, First Named Inventor: Jeffrey C. Hansom.
U.S. Appl. No. 15/275,531, filed Sep. 26, 2016, Entitled: Simultaneous Inbound Multi-Packet Processing, First Named Inventor: Jeffrey C. Hansom.

* cited by examiner

PROCESSING OF INBOUND BACK-TO-BACK COMPLETIONS IN A COMMUNICATION SYSTEM

BACKGROUND

Aspects are related generally to computer-based communication systems, and more specifically to processing of inbound back-to-back completions in a communication system of a computer system.

Peripheral component interconnect express (PCIe) is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

A high-bandwidth PCIe link (x16) can transmit two full transaction layer packets (TLPs) in a single scaled clock cycle and must process two partial completion TLPs simultaneously. PCIe completions can be fragmented into multiple partial completions (also referred to as "completion fragments") by the completer. Partial completions are issued in address order and must be reassembled by the receiver. After each completion is received, the PCIe completion table (PCT) of the receiver must be updated with a new offset and byte count modified (BCM) values, which are used to look for, error check, and properly process future inbound completions.

In some PCIe instances, the bandwidth is high enough to cause two full PCIe TLPs to be received in a single cycle. TLPs must be processed simultaneously, passing error checks and assembling completion data in the proper location. Due to cycle timing requirements, not all lookup operations, calculations and compares can be done in a single clock cycle, so the processing pipeline is multiple cycles deep. This creates difficulties when two separate pipelines can process pieces of the same completion.

SUMMARY

According to one embodiment, a system includes an input/output adapter operable to receive a plurality of packets. The system further includes a controller operatively connected to the input/output adapter. The controller is operable to receive a first packet including completion data on a first multi-stage pipeline and a second packet including completion data on a second multi-stage pipeline in parallel. The controller is operable to share completion update information between the first multi-stage pipeline and the second multi-stage pipeline based on determining that the completion data of the first packet and the completion data of the second packet are associated with a same request. The controller is further operable to adjust an aspect of the completion update information to maintain a sequential completion order in a buffer to hold the completion data of the first packet and the completion data of the second packet based on the sharing of the completion update information between the first multi-stage pipeline and the second multi-stage pipeline.

According to an embodiment, a method includes receiving a first packet including completion data on a first multi-stage pipeline and a second packet including completion data on a second multi-stage pipeline in parallel at an input/output adapter operatively connected to a controller. Completion update information is shared between the first multi-stage pipeline and the second multi-stage pipeline based on determining that the completion data of the first packet and the completion data of the second packet are associated with a same request. An aspect of the completion update information is adjusted to maintain a sequential completion order in a buffer to hold the completion data of the first packet and the completion data of the second packet based on the sharing of the completion update information between the first multi-stage pipeline and the second multi-stage pipeline.

According to an embodiment, a computer program product includes a computer readable storage medium having program instructions embodied therewith. The program instructions are executable by a processing circuit of a controller to cause the processing circuit to perform receiving a first packet including completion data on a first multi-stage pipeline and a second packet including completion data on a second multi-stage pipeline in parallel at an input/output adapter operatively connected to the controller. Completion update information is shared between the first multi-stage pipeline and the second multi-stage pipeline based on determining that the completion data of the first packet and the completion data of the second packet are associated with a same request. An aspect of the completion update information is adjusted to maintain a sequential completion order in a buffer to hold the completion data of the first packet and the completion data of the second packet based on the sharing of the completion update information between the first multi-stage pipeline and the second multi-stage pipeline.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide processing of inbound back-to-back completions in a computer system. Rather than using a single pipeline to handle processing of multiple completion packets, embodiments use a pair of multi-stage pipelines with cross pipeline communication to pass completion update information. The sharing of completion update information between the multi-stage pipelines enables one or more aspect of the completion update information to be adjusted to maintain a sequential completion order in a buffer that holds completion data. For example, if a completion associated with a request is split into multiple completion data fragments that are received in parallel in the multi-stage pipelines, exchanged completion update information, such as an address offset in the buffer and a byte count remaining for a completion data entry in the buffer, can be used to maintain sequential ordering between the completion data fragments. Thus, contention between conflicting accesses to a completion table and the buffer can be mitigated.

Figure 1:
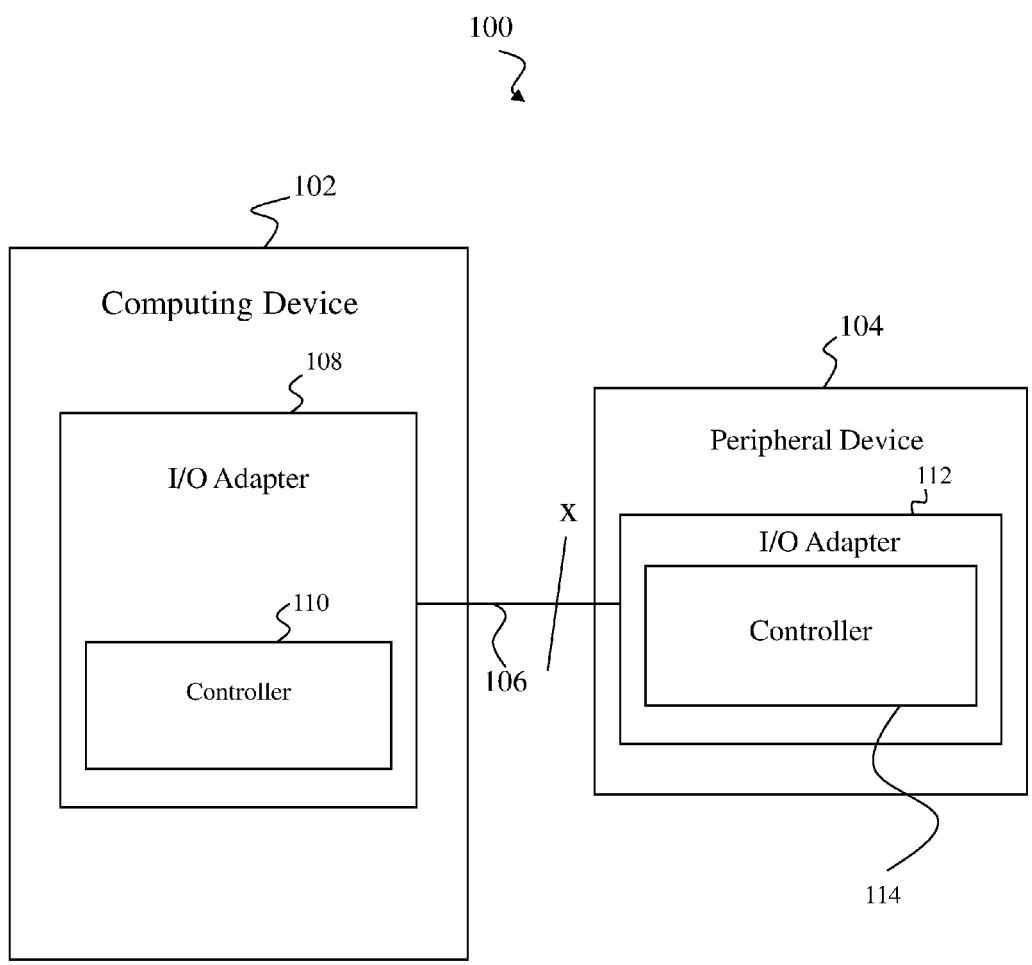
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
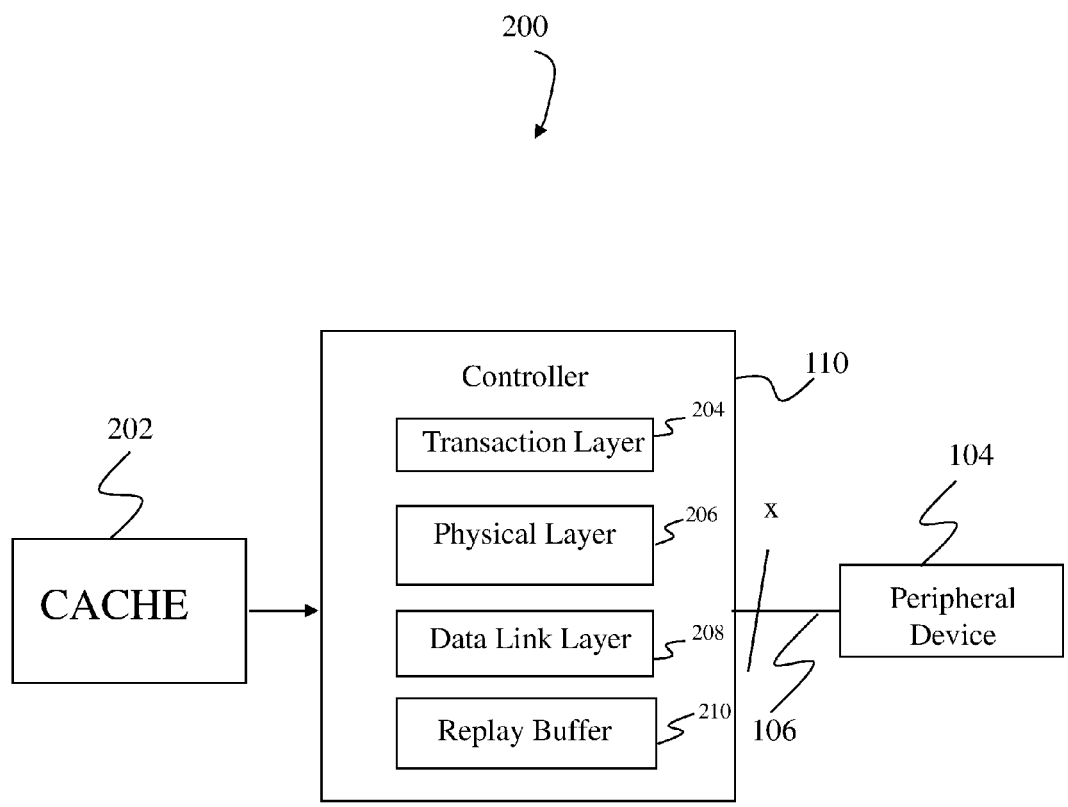
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a replay buffer 210. In general, the replay buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the replay buffer 210.

The transaction layer 204 assembles packets of transaction requests, such as reads and writes, from the computing device 102 (FIG. 1). In common usage, these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the replay buffer 210, known as a link layer retry (LLR).

Figure 3:
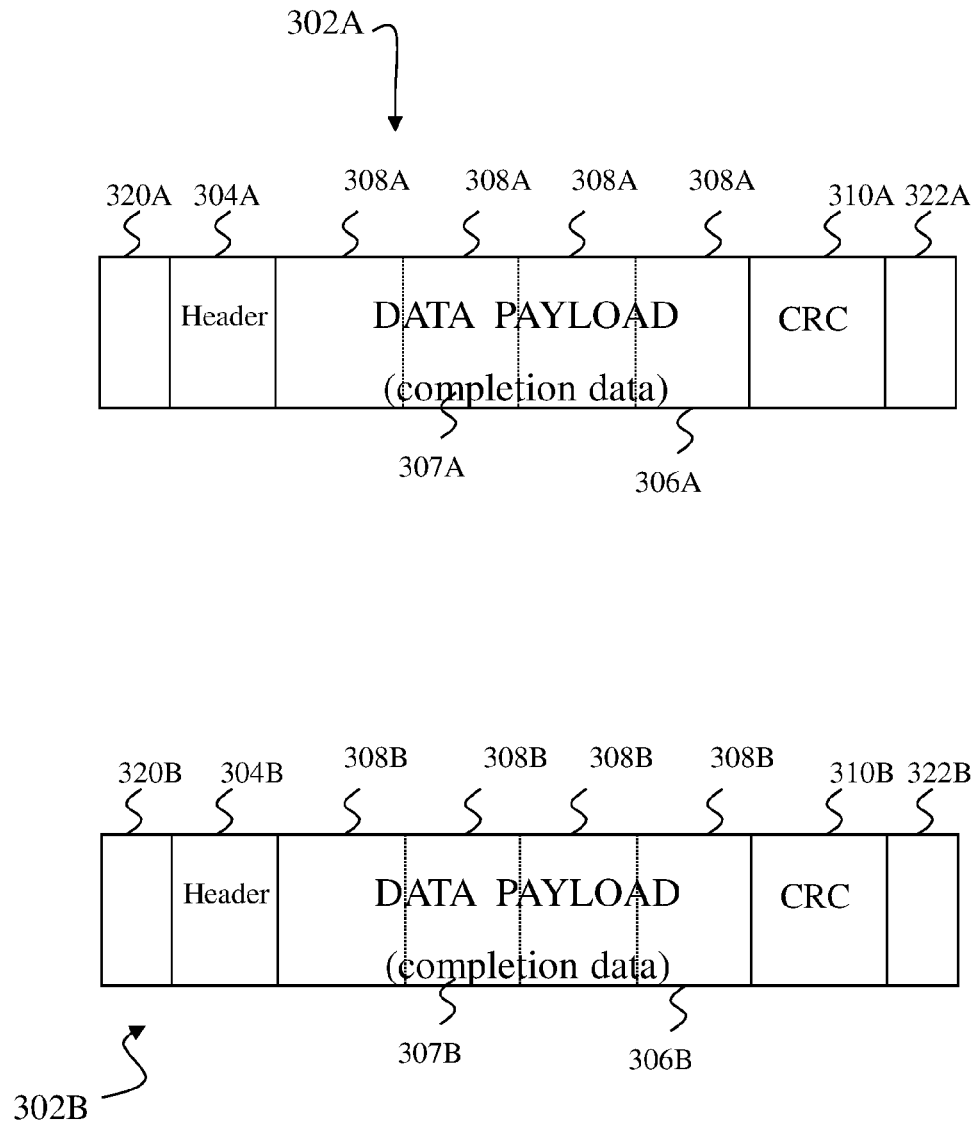
FIG. 3 illustrates a pair of packets received and processed in accordance with an embodiment.

FIG. 3 illustrates a pair of packets received and processed in accordance with an embodiment. A first packet 302A and a second packet 302B can be received on separate pipelines in a same clock cycle. The first packet 302A can include a header portion 304A, a payload portion 306A including completion data 307A, and cyclical redundancy check (CRC) portion 310A used for error detection and correction. The first packet 302A may also include framing symbols marking the beginning 320A and the end 322A of the first packet 302A. Similarly, the second packet 302B can include a header portion 304B, a payload portion 306B including completion data 307B, and CRC portion 310B used for error detection and correction. The second packet 302B may also include framing symbols marking the beginning 320B and the end 322B of the second packet 302B.

Each of the payload portions 306A and 306B can be divided by multiple boundaries 308A and 308B respectively. Each boundary 308A, 308B can be a fixed distance from its nearest neighbor. In one embodiment, the distance between each boundary 308A, 308B is the width of the interface supplying the data.

Figure 4:
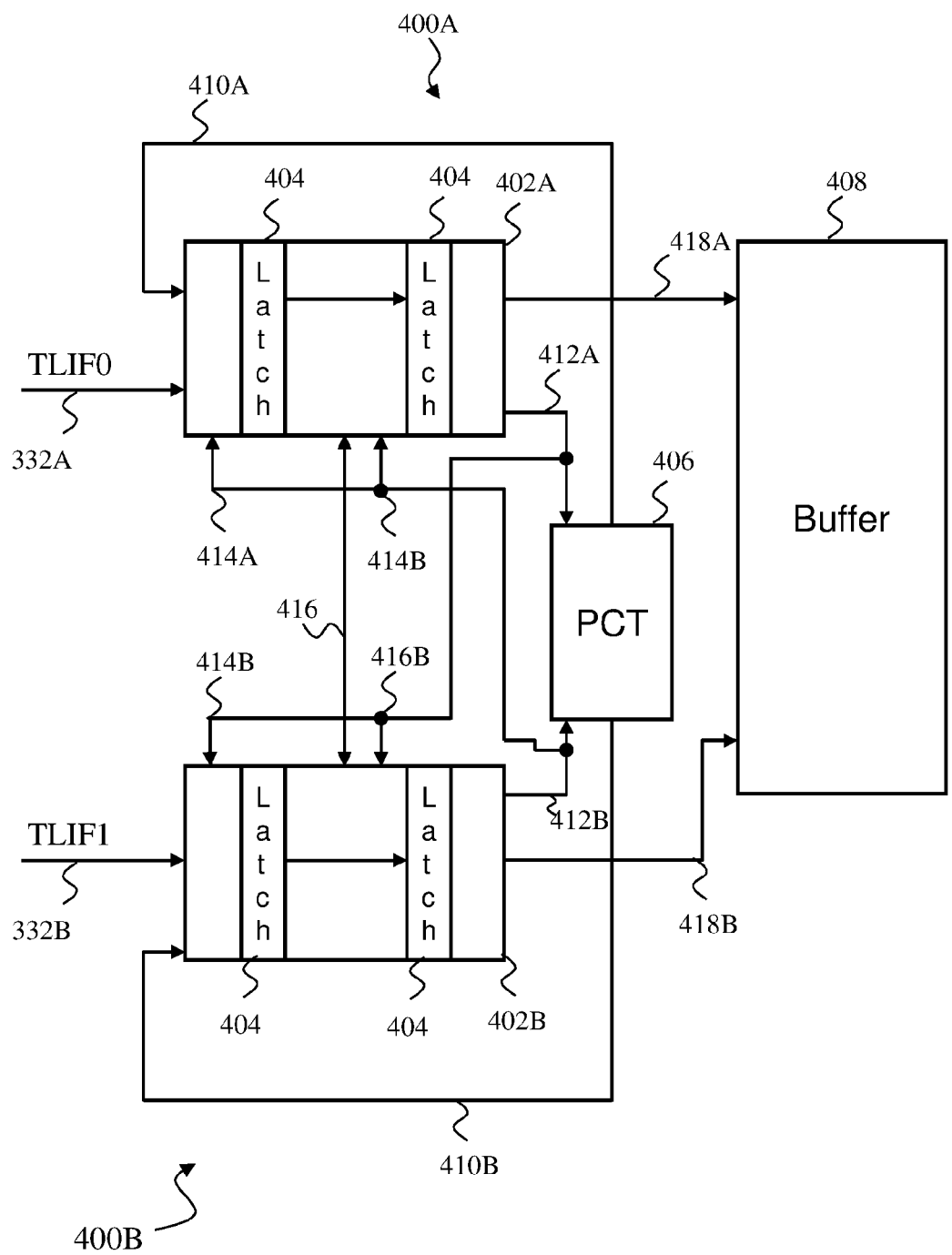
FIG. 4 illustrates transaction layer packet receiver interfaces in accordance with an embodiment.

With reference to FIGS. 3 and 4, a portion of the first packet 302A can be routed through a transaction layer interface 332A to a first multi-stage pipeline 402A of a transaction layer packet receiver interface 400A. A portion of the second packet 302B can also be routed through a transaction layer interface 332B to a second multi-stage pipeline 402B of a transaction layer packet receiver interface 400B. The transaction layer interface 332A and the transaction layer interface 332B may each be a 32 byte wide bus in some embodiments. The first multi-stage pipeline 402A and the second multi-stage pipeline 402B are each formed of a plurality of stages 404 depicted as latches in FIG. 4 to indicate that processing delays can occur when passing through the pipelines 402A, 402B to provide adequate time for lookups, calculations, and error checking to complete before updating a completion table 406 (also referred to as PCIe completion table (PCT)) with completion update information and buffer 408 with the completion data 307A, 307B.

The completion table 406 can be coupled to an input 410A and an output 412A of the first multi-stage pipeline 402A. The completion table 406 can also be coupled to an input 410B and an output 412B of the second multi-stage pipeline 402B. The output 412A of the first multi-stage pipeline 402A can be provided to at least two different stages 404 of the second multi-stage pipeline 402B, for instance, at a first stage location 414B and a second stage location 416B of the second multi-stage pipeline 402B. The output 412B of the second multi-stage pipeline 402B can be to at least two different stages 404 of the first multi-stage pipeline 402A, for instance, at a first stage location 414A and a second stage location 416A of the first multi-stage pipeline 402A. An exchange link 416 allows sharing of completion update information between a same stage of the first multi-stage pipeline 402A and the second multi-stage pipeline 402B based on determining that the completion data 307A of the first packet 302A and the completion data 307B of the second packet 302B are associated with a same request. An output 418A of the first multi-stage pipeline 402A enables storage of completion data 307A of the first packet 302A to the buffer 408, and an output 418B of the second multi-stage pipeline 402B enables storage of completion data 307B of the first packet 302A to the buffer 408. Although described as the first packet 302A being routed through the first multi-stage pipeline 402A, the completion data 307A need not be sequentially before the completion 307B in expected ordering, as relative ordering of received packets can alternate between the first and second multi-stage pipeline 402A, 402B in embodiments. The various connections for exchanging completion update information between the first and second multi-stage pipeline 402A, 402B can provide support for back-to-back completions occurring in parallel and/or in a sequence of completion data fragments that collectively form a completion for a request.

Figure 5:
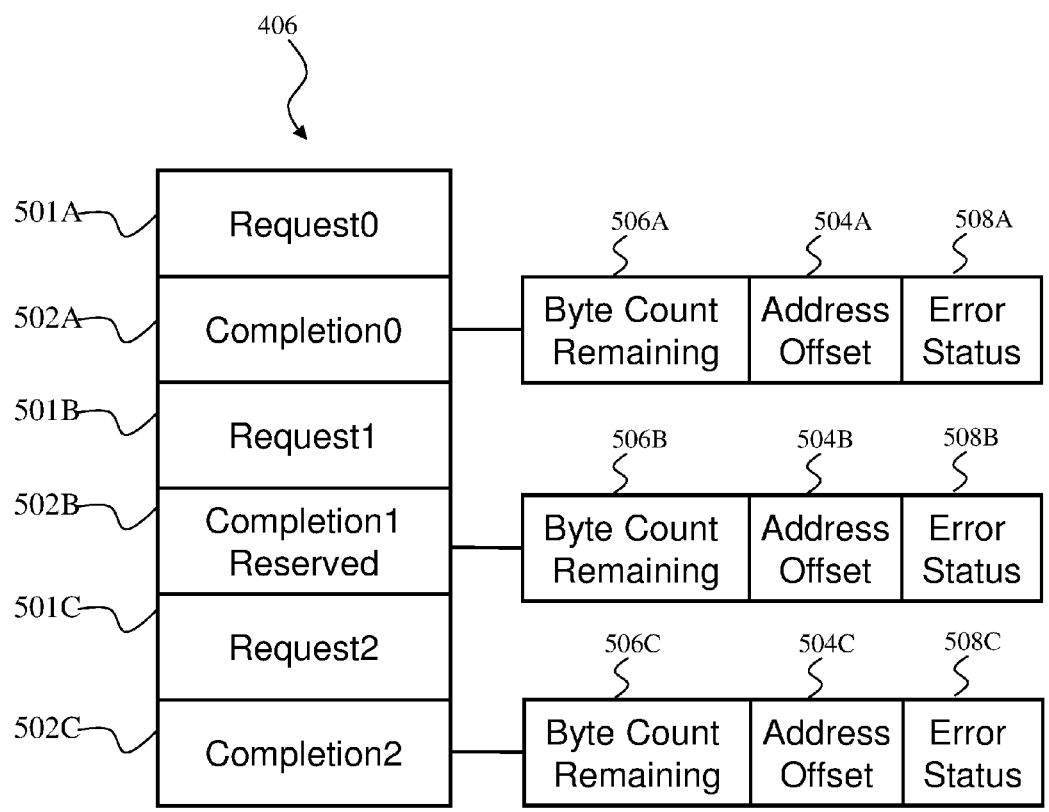
FIG. 5 illustrates a portion of a completion table in accordance with an embodiment.
Figure 6:
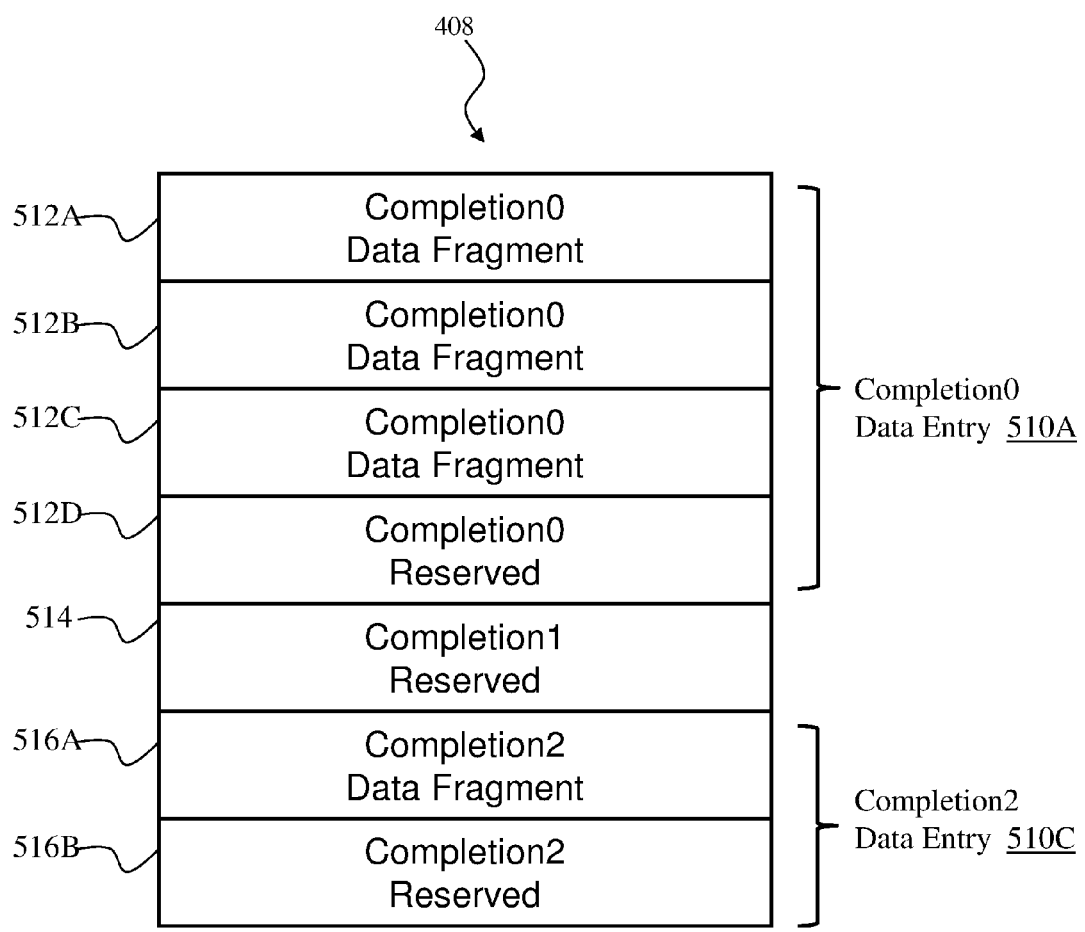
FIG. 6 illustrates a portion of a buffer in accordance with an embodiment.

Although embodiments of FIGS. 4-6 are described in reference to controller 110 of FIG. 1, it will be understood that other controllers, such as controller 114 of FIG. 1, can implement the same or similar functionality as described herein. The controller 110 can perform reading and storing of completion update information 502 of FIG. 5 in the completion table 406 accessible by the first multi-stage pipeline 402A and the second multi-stage pipeline 402B. The completion update information 502 can include an address offset 504 targeting the buffer 408 and a byte count remaining 506 for a completion data entry 510 in the buffer 408 corresponding to a same request 501 as depicted in FIGS. 5 and 6. For instance, requests 501A, 501B, 501C (and others (not depicted)) are recorded in the completion table 406 upon sending non-posted requests, such as read requests to the I/O adapter 112 of FIG. 1. Each of the requests 501A, 501B, 501C has reserved or actual values received for completion update information 502 including completion update information 502A corresponding to request 501A, completion update information 502B corresponding to request 501B, and completion update information 502C corresponding to request 501C (and others (not depicted)). The completion update information 502A associated with request 501A that is stored in the completion table 406 can include an address offset 504A to completion data entry 510A in buffer 408, a byte count remaining 506A indicating a number of bytes left to be received in the completion data entry 510A, an error status 508A, and/or other values (not depicted). The completion update information 502B associated with request 501B that is stored in the completion table 406 can include an address offset 504B to completion data entry 510B in buffer 408, a byte count remaining 506B indicating a number of bytes left to be received in the completion data entry 510B, an error status 508B, and/or other values (not depicted). The completion update information 502C associated with request 501C that is stored in the completion table 406 can include an address offset 504C to completion data entry 510C in buffer 408, a byte count remaining 506C indicating a number of bytes left to be received in the completion data entry 510C, an error status 508C, and/or other values (not depicted).

As one example, the completion data 307A of the first packet 302A and the completion data 307B of the second packet 302B can be completion data fragments 512A, 512B of the completion data entry 510A in the buffer 408. In the processing of the completion data 307A, 307B in parallel, the first multi-stage pipeline 402A and the second multi-stage pipeline 402B both read the completion update information 502A from the completion table 406 to determine where the completion data 307A, 307B is to be written in the buffer 408, for instance, as completion data fragment 512A, 512B, 512C, or 512D. Since single values of the address offset 504A, byte count remaining 506A, and error status 508A are shared for all completion data fragments 512A-512D forming the completion data entry 510A, cross communication between the first and second multi-stage pipelines 402A, 402B ensures that sequential ordering is maintained in the buffer 408. For example, if completion data 307B maps to completion data fragment 512B, the completion update information 502A is first used and modified with respect to the first packet 302A to reflect sizing, offset, and error status of the completion data 307A targeting the completion data fragment 512A before updating the completion update information 502A with respect to the second packet 302B to reflect sizing, offset, and error status of the completion data 307B targeting the completion data fragment 512B. Similarly, in a continued back-to-back sequence, completion update information 502A is used and modified with respect to the second packet 302B to reflect sizing, offset, and error status of the completion data 307B at the second multi-stage pipeline 402B targeting the completion data fragment 512B before modifying the completion update information 502A for a third packet (not depicted) at the first multi-stage pipeline 402A targeting the completion data fragment 512C of the completion data entry 510A. Similar processing can be performed for a reserved completion data fragment 514 in the buffer 408 and completion data fragments 516A, 516B of completion data entry 510C in the buffer 408.

In an embodiment, the controller 110 can set the error status 508A of the completion update information 502A based on detection of at least one error in receiving the completion data 307A, 307B for the same request 501A. The controller 110 can prevent the completion data 307A, 307B from being written to the buffer 408 based on the error status 508A indicating an error condition. Once an error is detected, future received completion fragments can be discarded for the same completion.

Figure 7:
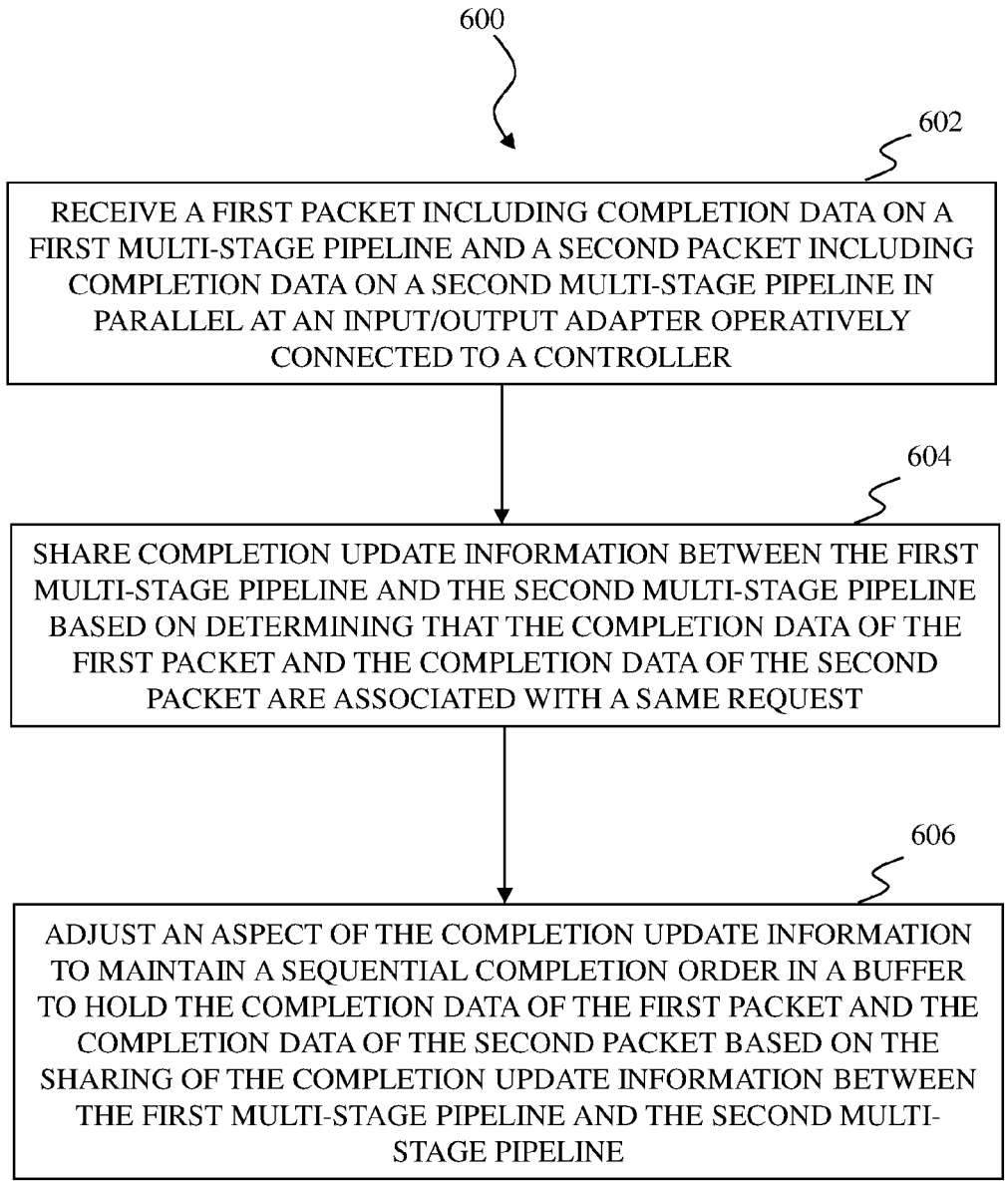
FIG. 7 illustrates a process flow in accordance with an embodiment.

Turning now to FIG. 7, a flow diagram of a process 600 is generally shown in accordance with an embodiment. The process 600 is described with reference to FIGS. 1-6 and may include additional steps beyond those depicted in FIG. 7. Although described in reference to controller 110, it will be understood that the process 600 can be performed by other controllers, such as controller 114.

At block 602, a first packet 302A including completion data 307A is received on a first multi-stage pipeline 402A, and a second packet 302B including completion data 307B is received on a second multi-stage pipeline 402B in parallel at an I/O adapter 108 operatively connected to a controller 110. The I/O adapter 108 can be a PCIe adapter.

At block 604, the controller 110 shares completion update information 502A between the first multi-stage pipeline 402A and the second multi-stage pipeline 402B based on determining that the completion data 307A of the first packet 302A and the completion data 307B of the second packet 302B are associated with a same request 501A.

At block 606, the controller 110 adjusts an aspect of the completion update information 502A to maintain a sequential completion order in the buffer 408 to hold the completion data 307A of the first packet 302A and the completion data 307B of the second packet 302B based on the sharing of the completion update information 502A between the first multi-stage pipeline 402A and the second multi-stage pipeline 402B. Space in the buffer 408 can be reserved for a plurality of completions associated with a plurality of requests to maintain the sequential completion order in the buffer 408 for the completions received in any order.

Figure 8:
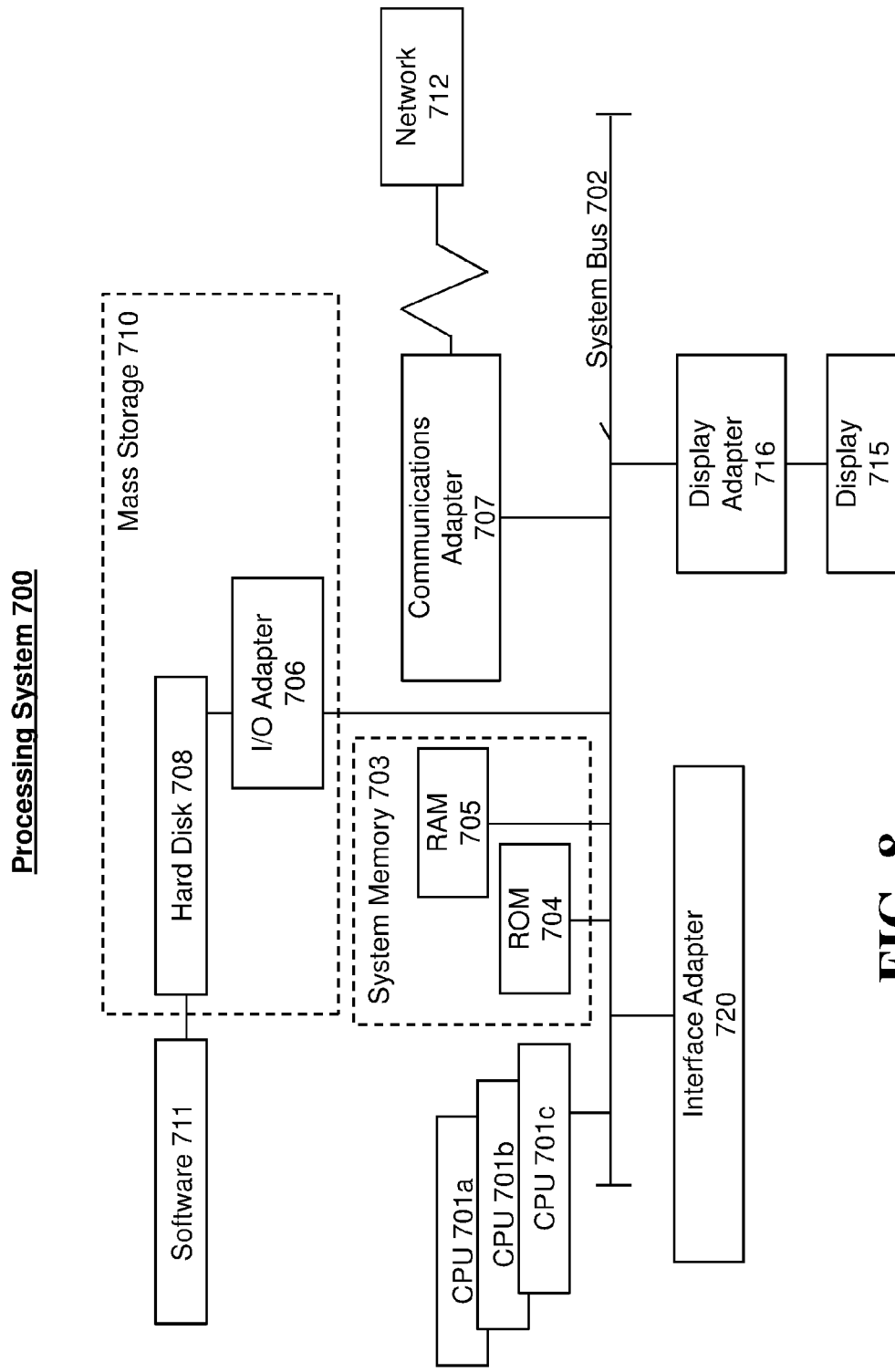
FIG. 8 illustrates a processing system in accordance with an embodiment.

Referring now to FIG. 8, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 8 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 7. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 8, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 8.

Technical effects and benefits include processing of inbound back-to-back completions in a computer system.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for processing inbound back-to-back completions by sharing completion update information via a completion table, the system comprising:
an input/output adapter that receives a plurality of packets; and
a controller connected to the input/output adapter, wherein the controller:
receives a first packet comprising completion data on a first multi-stage pipeline and a second packet comprising completion data on a second multi-stage pipeline in parallel,
wherein the inbound back-to-back completions comprises the first and second packets of the plurality of packets;
determines that the completion data of the first packet and the completion data of the second packet are associated with a same request to generate the completion update information;
stores and shares the completion update information in the completion table accessible by the first multi-stage pipeline and the second multi-stage pipeline; and
adjusts the completion update information to maintain a sequential completion order in a buffer to hold the completion data of the first packet and the completion data of the second packet based on the sharing of the completion update information between the first multi-stage pipeline and the second multi-stage pipeline,
wherein the completion update information comprises an address offset in the buffer and a byte count remaining for a completion data entry in the buffer corresponding to the same request.

2. The system of claim 1, wherein the input/output adapter is a peripheral component interconnect express (PCIe) adapter.

3. The system of claim 1, wherein the completion data of the first packet and the completion data of the second packet are completion data fragments of the completion data entry.

4. The system of claim 1, wherein the completion update information comprises an error status that is set based on detection of at least one error in receiving the completion data for the same request, and the completion data is prevented from being written to the buffer based on the error status indicating an error condition.

5. The system of claim 1, wherein the completion table is coupled to an input and an output of the first multi-stage pipeline, and the completion table is coupled to an input and an output of the second multi-stage pipeline.

6. The system of claim 5, wherein the output of the first multi-stage pipeline is provided to at least two different stages of the second multi-stage pipeline, and the output of the second multi-stage pipeline is provided to at least two different stages of the first multi-stage pipeline.

7. The system of claim 1, wherein the controller reserves space in the buffer for a plurality of completions associated with a plurality of requests to maintain the sequential completion order in the buffer for the completions received in any order.

8. A method for processing inbound back-to-back completions by sharing completion update information via a completion table, the method comprising:
receiving a first packet comprising completion data on a first multi-stage pipeline and a second packet comprising completion data on a second multi-stage pipeline in parallel at an input/output adapter connected to a controller,
wherein the inbound back-to-back completions comprises the first and second packets of the plurality of packets;
determining that the completion data of the first packet and the completion data of the second packet are associated with a same request to generate the completion update information;
stores and shares the completion update information in the completion table accessible by the first multi-stage pipeline and the second multi-stage pipeline; and
adjusting completion update information to maintain a sequential completion order in a buffer to hold the completion data of the first packet and the completion data of the second packet based on the sharing of the completion update information between the first multi-stage pipeline and the second multi-stage pipeline,
wherein the completion update information comprises an address offset in the buffer and a byte count remaining for a completion data entry in the buffer corresponding to the same request.

9. The method of claim 8, wherein the input/output adapter is a peripheral component interconnect express (PCIe) adapter.

10. The method of claim 8, wherein the completion data of the first packet and the completion data of the second packet are completion data fragments of the completion data entry.

11. The method of claim 8, further comprising:
setting an error status of the completion update information based on detection of at least one error in receiving the completion data for the same request; and
preventing the completion data from being written to the buffer based on the error status indicating an error condition.

12. The method of claim 8, wherein the completion table is coupled to an input and an output of the first multi-stage pipeline, and the completion table is coupled to an input and an output of the second multi-stage pipeline.

13. The method of claim 12, further comprising:
providing the output of the first multi-stage pipeline to at least two different stages of the second multi-stage pipeline; and
providing the output of the second multi-stage pipeline to at least two different stages of the first multi-stage pipeline.

14. The method of claim 8, further comprising reserving space in the buffer for a plurality of completions associated with a plurality of requests to maintain the sequential completion order in the buffer for the completions received in any order.

15. A computer program product comprising a computer readable storage medium having program instructions for processing inbound back-to-back completions by sharing completion update information via a completion table embodied therewith, the program instructions executable by a processing circuit of a controller to cause the processing circuit to perform:
receiving a first packet comprising completion data on a first multi-stage pipeline and a second packet comprising completion data on a second multi-stage pipeline in parallel at an input/output adapter connected to a controller,
wherein the inbound back-to-back completions comprises the first and second packets of the plurality of packets;

determining that the completion data of the first packet and the completion data of the second packet are associated with a same request to generate the completion update information;

stores and shares the completion update information in the completion table accessible by the first multi-stage pipeline and the second multi-stage pipeline; and adjusting completion update information to maintain a sequential completion order in a buffer to hold the completion data of the first packet and the completion data of the second packet based on the sharing of the completion update information between the first multi-stage pipeline and the second multi-stage pipeline, wherein the completion update information comprises an address offset in the buffer and a byte count remaining for a completion data entry in the buffer corresponding to the same request.

* * * * *